US010863560B2

(12) United States Patent
Stille et al.

(10) Patent No.: US 10,863,560 B2
(45) Date of Patent: Dec. 8, 2020

(54) FIRST NETWORK NODE, RECEIVING NETWORK NODE AND METHODS PERFORMED THEREIN

(71) Applicant: Telefonaktiebolaget LM Ericsson (publ), Stockholm (SE)

(72) Inventors: Mats Stille, Bromma (SE); Ralf Keller, Würselen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 36 days.

(21) Appl. No.: 15/772,642

(22) PCT Filed: Nov. 18, 2015

(86) PCT No.: PCT/SE2015/051242
§ 371 (c)(1),
(2) Date: May 1, 2018

(87) PCT Pub. No.: WO2017/086847
PCT Pub. Date: May 26, 2017

(65) Prior Publication Data
US 2019/0141760 A1  May 9, 2019

(51) Int. Cl.
*H04W 76/12* (2018.01)
*H04W 76/11* (2018.01)
(Continued)

(52) U.S. Cl.
CPC ............ *H04W 76/12* (2018.02); *H04W 76/11* (2018.02); *H04W 4/40* (2018.02); *H04W 24/08* (2013.01)

(58) Field of Classification Search
CPC ..... H04W 76/12; H04W 76/11; H04W 24/08; H04W 4/40
See application file for complete search history.

(56) References Cited

U.S. PATENT DOCUMENTS

2004/0100914 A1* 5/2004 Hellwig ................ H04W 76/12
370/254
2012/0052885 A1  3/2012 Zhang et al.
2017/0054595 A1* 2/2017 Zhang ................ H04L 41/0896

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.1.0, Sep. 2015, pp. 1-106.

(Continued)

*Primary Examiner* — Thai Nguyen
(74) *Attorney, Agent, or Firm* — Patent Portfolio Builders, PLLC

(57) ABSTRACT

Embodiments herein relate to a method performed by a first network node (13) for enabling communication between a first wireless device (10) of a first core network in a communication network with a second wireless device (11) of a second core network in the communication network (1). The first network node (13) supports a first set of functionalities out of a total set of functionalities in the first core network of the communication network, which first set of functionalities belongs to a first network slice of the first core network, and is separated from another set of functionalities out of the total set of functionalities in the first core network. The first network node (13) initiates a request transmission, to a receiving network node (17), for communicating with the second wireless device, which request transmission comprises a first network slice identity, first network slice ID, of the first network slice identifying the supported first set of functionalities.

13 Claims, 12 Drawing Sheets

(51) Int. Cl.
H04W 4/40 (2018.01)
H04W 24/08 (2009.01)

(56) References Cited

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, pp. 1-334.
"3GPP TR 23.707 V13.0.0 (Dec. 2014)", 3rd Generation Partnership Project; Technical Specification Group Services and System Aspects; Architecture Enhancements for Dedicated Core Networks; Stage 2 (Release 13), Dec. 2014, pp. 1-39.
"Corrected MTC terminology", SA WG2 Meeting #BBE; S2-120282; Electronic meeting; same as S2-114347, May 7, 2011, pp. 1-5.
"Update the network slicing use case in SMARTER", 3GPP TSG-SA WG1 Meeting #71; S1-152074; Belgrade, Serbia, Aug. 17-21, 2015, pp. 1-3.
"Use case on Traffic relay and slicing", 3GPP TSG-SA WG1 Ad-hoc on SMARTER; S1-153054; Vancouver, Canada, Oct. 19-21, 2015, pp. 1-2.
Office Action issued in corresponding EP Application No. 15813615.0 dated Mar. 19, 2020, 05 Pages.

* cited by examiner

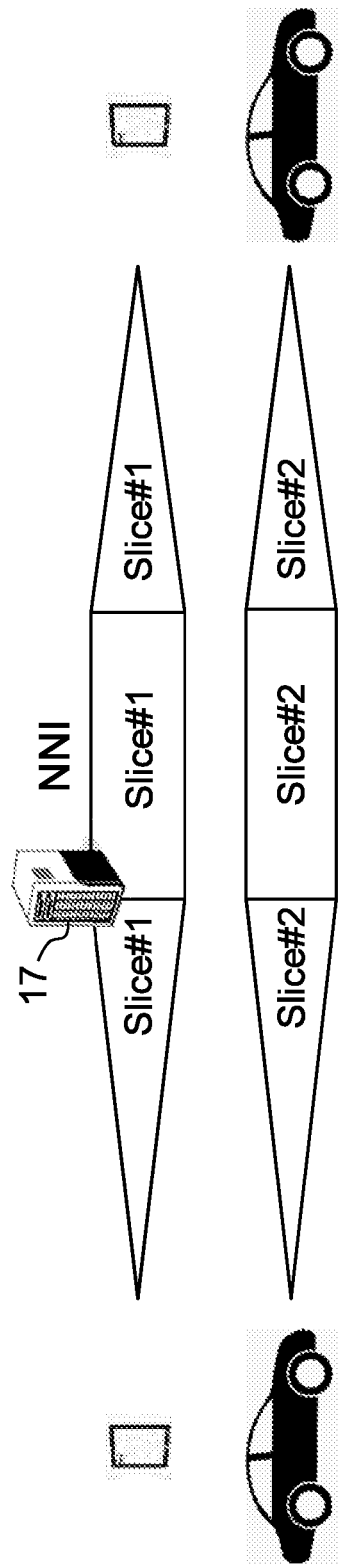
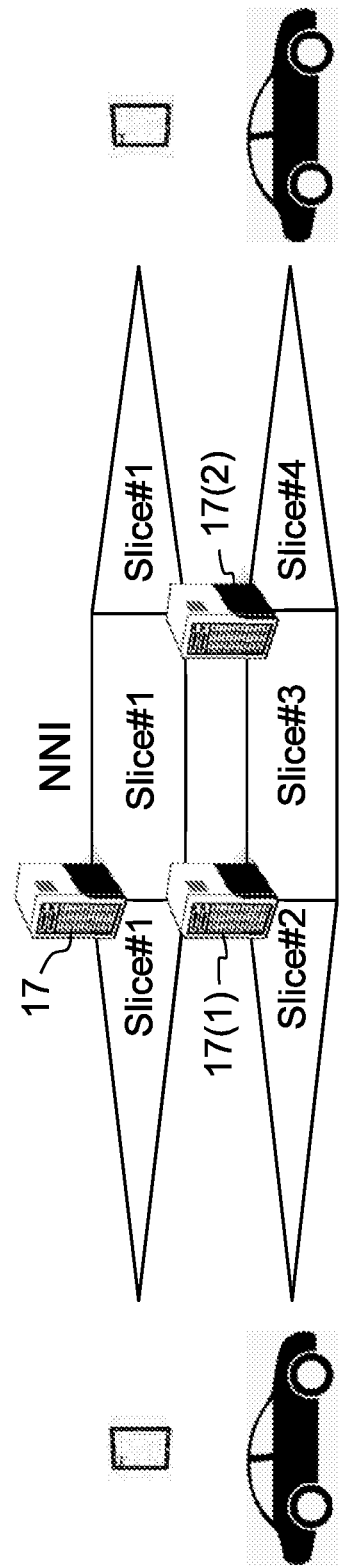

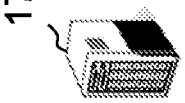
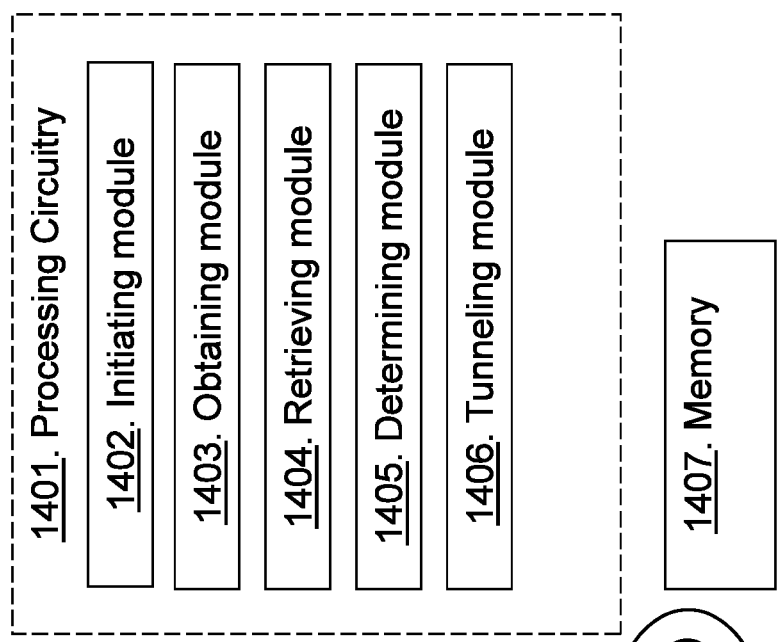
Fig. 14

FIRST NETWORK NODE, RECEIVING NETWORK NODE AND METHODS PERFORMED THEREIN

TECHNICAL FIELD

Embodiments herein relate to a first network node, a receiving network node, and methods performed therein for wireless communication. Furthermore, a computer program and a computer readable storage medium are also provided herein. In particular, embodiments herein relate to enabling communication between a first wireless device of a first core network in a communication network and a second wireless device of a second core network in the communication network.

BACKGROUND

In a typical communication network, wireless devices, also known as wireless communication devices, mobile stations, stations (STA) and/or user equipments (UE), communicate via a Radio Access Network (RAN) to one or more core networks. The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". The area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs are typically connected to one or more core networks.

Specifications for the Evolved Packet System (EPS), also called as Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as a radio access network of an LTE network, and the Evolved Packet Core (EPC), also known as System Architecture Evolution (SAE) core network. E-UTRAN/LTE is a 3GPP radio access network, wherein the radio network nodes are directly connected to the EPC core network rather than to RNCs. In general, in E-UTRAN/LTE, the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain and comprises the EPC and E-UTRAN. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME), and a wireless or mobile device (UE) is found. The LTE radio access, E-UTRAN, comprises one or more eNBs. FIG. 2 shows the overall E-UTRAN architecture and is further defined in, for example, 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management function e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.
Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. Current assumption is that the RAN-CN split is similar for 5G as for 4G, implying an (evolved) S1 interface. An INITIAL CONTEXT SETUP RESPONSE message is sent by eNB to the MME confirming the setup.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of that mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/user and control plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

Slicing can also be used to isolate different services in an operator's network. The goal of the network slice selection mechanism is therefore to direct a wireless device to the correct network slice as early as possible and to avoid re-direction from one network slice to another, which breaks the isolation between the network slices.

Future networks are expected to support new use cases going beyond the basic support for voice services and mobile broadband currently supported by existing cellular network, e.g. 2G/3G/4G. Some example use cases include:
Evolution of MBB
  Evolved communication services
  Cloud services
  Extended mobility and coverage
Mission critical Machine Type Communication
  Intelligent traffic systems
  Smart grid
  Industrial applications
Massive Machine Type Communication
  Sensors/actuators
  Capillary networks
Media
  Efficient on-demand media delivery
  Media awareness
  Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of
Enterprise services
Government services, e.g. national safety
Verticals industries, e.g. automation, transportation
Residential users These different users and services are also expected to put new requirements on the network. Network slicing introduces the possibility that the network slices are used for different services and use cases. FIG. 5 shows an example of the network slicing for a case when there exists different network slices in the core network for MBB, Massive MTC and Critical MTC.

A new standard denoted 3GPP DECOR is developing solutions where wireless devices with different performance and robustness requirements like machine type and mobile broadband can be isolated from one another over the different network slices. Thereby misbehaving wireless devices in one network slice should not negatively impact performance of other network slices. The concept of network slices is at the moment limited to separating resources or functionalities in packet core, but may also be extended to servers with connectivity to packet core within the same Public Land Mobile Network (PLMN).

Network slicing introduces the possibility that the network slices are used for different services and use cases and there is a need to use these services for wireless devices in the wireless communication network.

Today, mobile devices such as phones and tablets with Voice over LTE (VoLTE) related applications are served by a IP Multimedia Subsystem (IMS) network via IMS Access point name (APN) via EPC, and MTC devices may be served by another dedicated network elements. Each of these network elements is connected with other remote network elements serving the same kind of device applications in order to secure a homogenous end-to-end experience. This is illustrated in FIG. 6, where a tablet using VoLTE is served by a first network slice, slice #1, and a vehicle being an MTC device is served by a second network slice, slice #2.

With next generation virtualized packet network, it will be easier for operators of the communication network to separate out e.g. machine type devices from mobile broadband devices over the access, or to separate Enterprise from consumer communication and a need to provide services exists. FIG. 7 shows an example of communication over different communication networks serving a same network slice, e.g. same kind of wireless devices. There is a need to enable the communication as shown in FIG. 7 in an efficient manner.

SUMMARY

An object of embodiments herein is to provide a mechanism for improving performance of services in the wireless communication network in an efficient manner.

According to an aspect the object is achieved by a method performed by a first network node for enabling communication between a first wireless device of a first core network in a communication network and a second wireless device of a second core network in the communication network. The first network node supports a first set of functionalities out of a total set of functionalities in the first core network of the communication network, which first set of functionalities belongs to a first network slice of the first core network, and is separated from another set of functionalities out of the total set of functionalities in the first core network. The first network node initiates a request transmission, to a receiving network node, for communicating with the second wireless device, which request transmission comprises a first network slice identity, first network slice ID, of the first network slice identifying the supported first set of functionalities.

According to another aspect the object is achieved by a method performed by a receiving network node for enabling communication between a first wireless device of a first core network in a communication network and a second wireless device of a second core network in the communication network. The receiving network node receives from a first network node in the first core network, a request transmission for communicating with the second wireless device. The request transmission comprises a first network slice identity of a first network slice, which first network slice identity identifies a first set of functionalities supported by the first network node out of a total set of functionalities in the first core network of the communication network. The first set of functionalities belongs to the first network slice of the first core network, and is separated from another set of functionalities out of the total set of functionalities in the first core network. The receiving network node then uses the received first network slice identity when setting up communication to the second wireless device.

According to yet another aspect the object is achieved by providing a first network node for enabling communication between a first wireless device of a first core network in a communication network and a second wireless device of a second core network in the communication network. The first network node is configured to support a first set of functionalities out of a total set of functionalities in the first core network of the communication network, which first set of functionalities belongs to a first network slice of the first core network, and is separated from another set of functionalities out of the total set of functionalities in the first core network. The first network node is configured to initiate a request transmission, to a receiving network node, for communicating with the second wireless device. The request transmission comprises a first network slice identity of the first network slice identifying the supported first set of functionalities.

According to still another aspect the object is achieved by providing a receiving network node for enabling communication between a first wireless device of a first core network in a communication network and a second wireless device of a second core network in the communication network. The receiving network node is configured to receive, from a first network node in the first core network, a request transmission for communicating with the second wireless device. The request transmission comprises a first network slice identity of a first network slice, which first network slice identity identifies a first set of functionalities supported by the first network node out of a total set of functionalities in the first core network of the communication network. The first set of functionalities belongs to the first network slice of the first core network, and is separated from another set of functionalities out of the total set of functionalities in the first core network. The receiving network node is further configured to use the received first network slice identity when setting up communication to the second wireless device.

It is furthermore provided herein a computer program comprising instructions, which, when executed on at least one processor, cause the at least one processor to carry out any of the methods above, as performed by the first network node or the receiving network node. It is additionally provided herein a computer-readable storage medium, having stored thereon a computer program comprising instructions which, when executed on at least one processor, cause the at least one processor to carry out the method according to any of the methods above, as performed by the first network node or the receiving network node.

By providing the first network slice ID in the request transmission the receiving network node is informed about the first set of functionalities and may use this information to map communication to a network slice of the second core network or the network to network interface. Hence, communication is efficiently set up and performance of the communication network is improved in an efficient manner.

BRIEF DESCRIPTION OF THE DRAWINGS

Embodiments will now be described in more detail in relation to the enclosed drawings, in which:

FIG. 12 is a schematic overview depicting an example of a using slicing according to embodiments herein;

FIG. 13 is a schematic overview depicting an example of a using slicing according to embodiments herein;

FIG. 14 is a block diagram depicting a network node according to embodiments herein.

DETAILED DESCRIPTION

Figure 1:
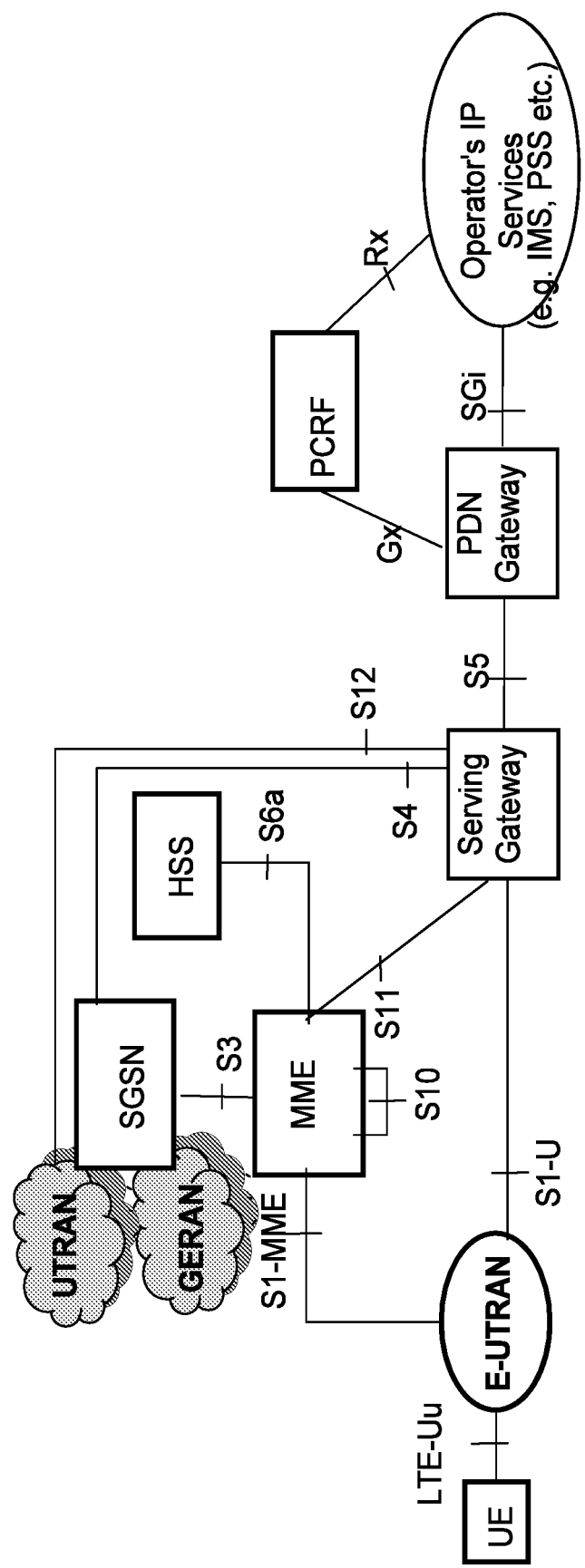
FIG. 1 is a schematic overview depicting a communication network according to prior art.
Figure 2:
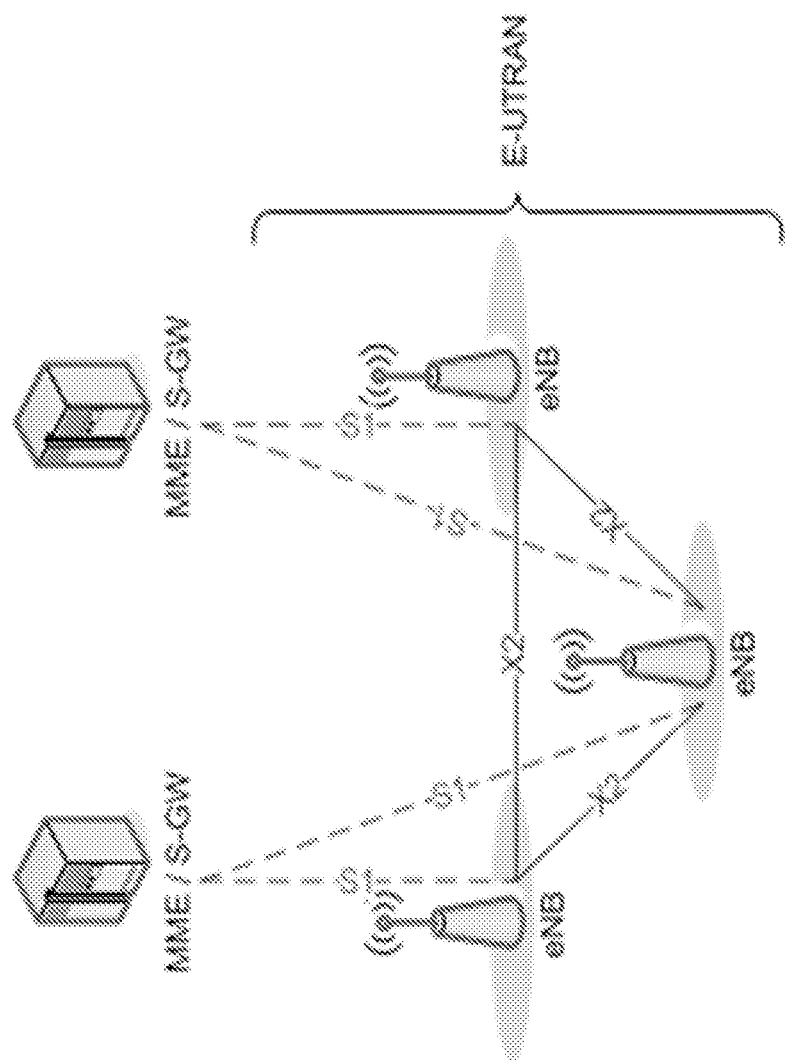
FIG. 2 is a schematic overview depicting a radio access network in connection with a core network.
Figure 3:
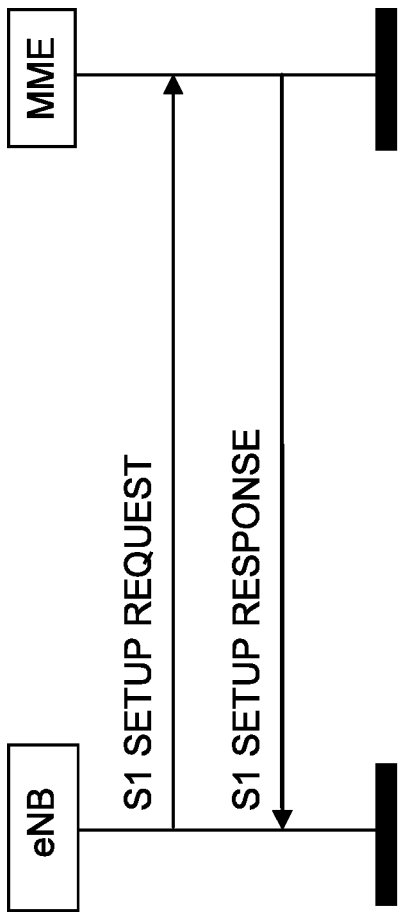
FIG. 3 is a signalling scheme according to prior art.
Figure 4:
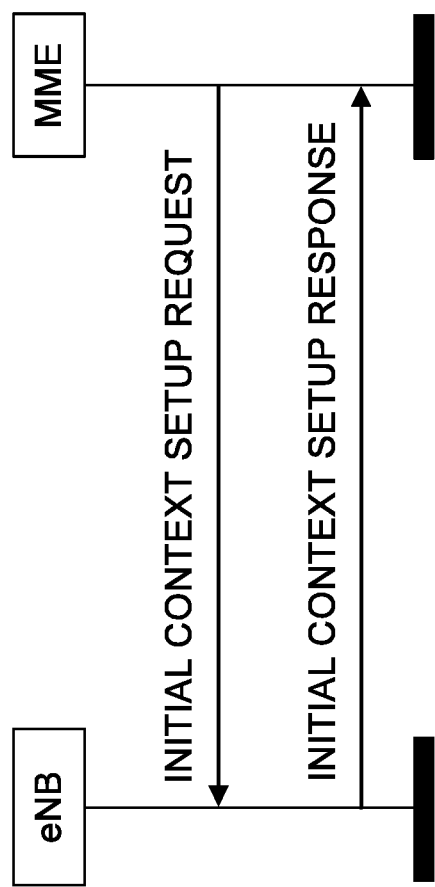
FIG. 4 is a signalling scheme according to prior art.
Figure 5:
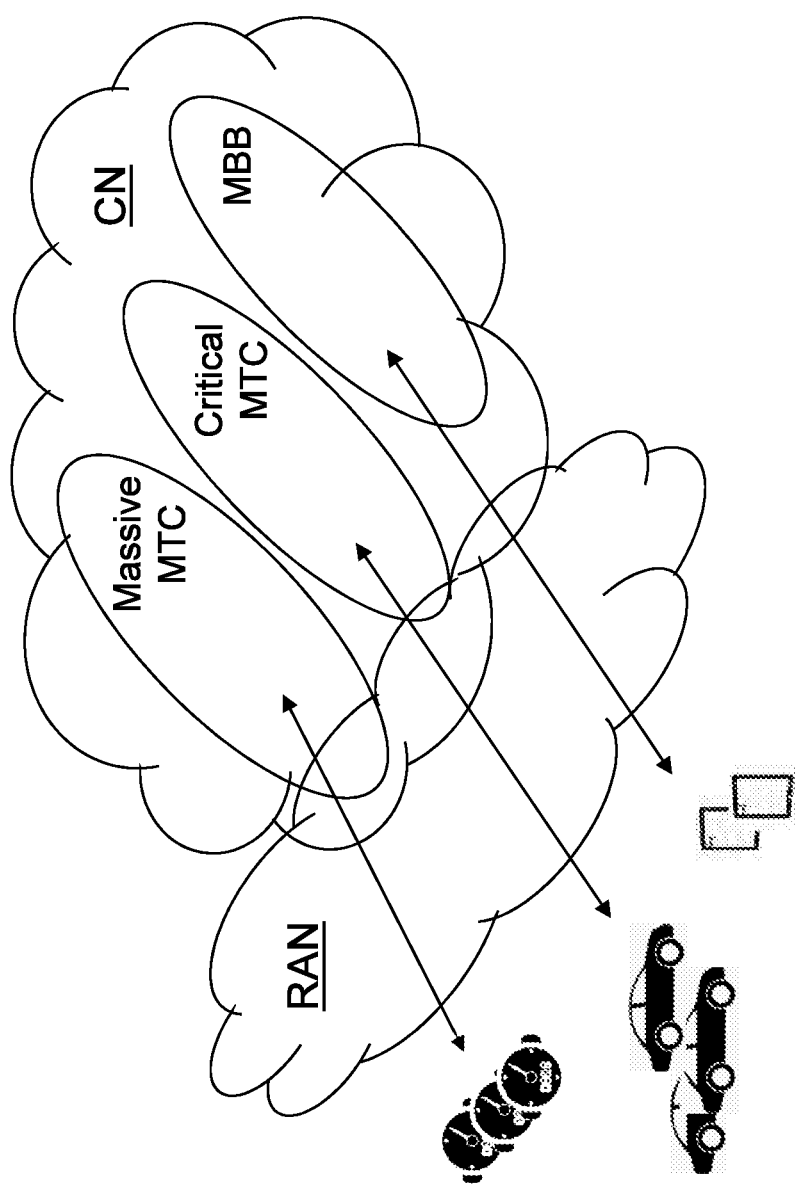
FIG. 5 is a schematic overview depicting an example of a slicing of a core network according to prior art.
Figure 6:
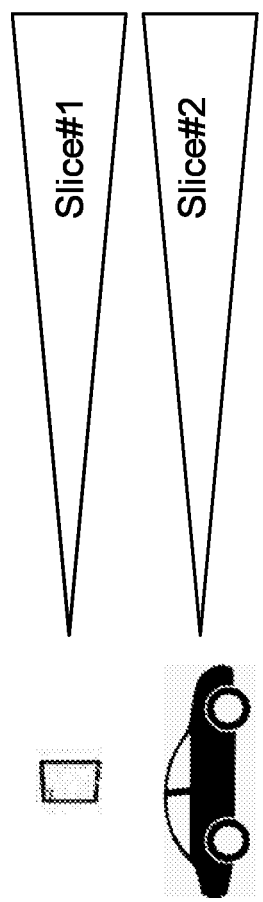
FIG. 6 is a schematic overview depicting an example of a using slicing according to prior art.
Figure 7:
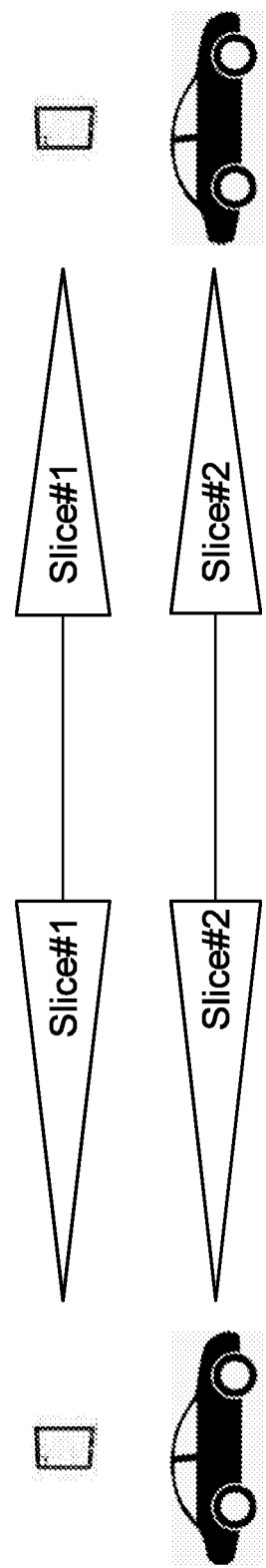
FIG. 7 is a schematic overview depicting an example of a using slicing according to prior art.
Figure 8:
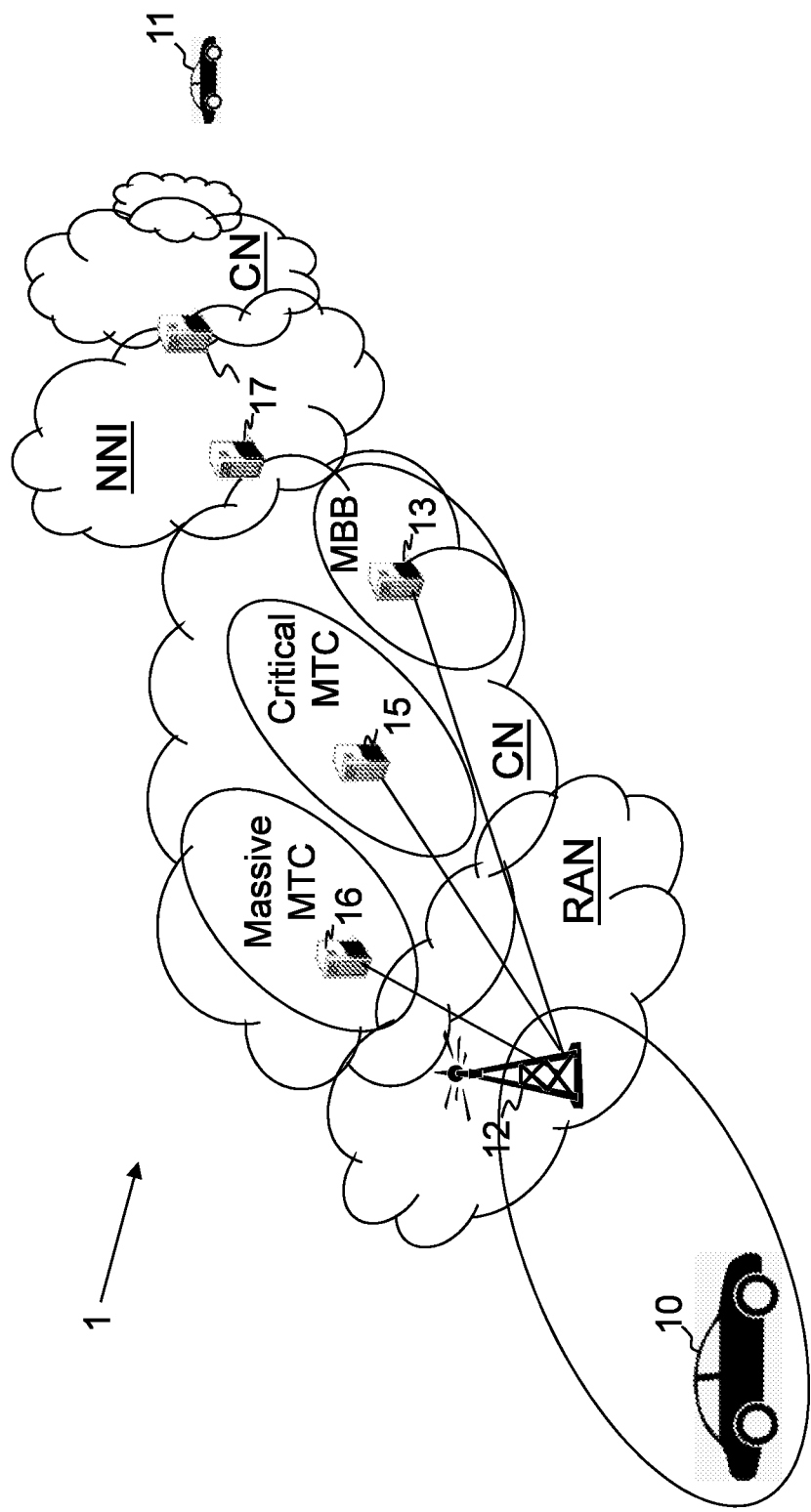
FIG. 8 is a schematic overview depicting a communication network 1 according to embodiments herein.

Embodiments herein relate to communication networks in general. FIG. 8 is a schematic overview depicting a communication network 1. The communication network 1 comprises one or more RANs and one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. WCDMA and LTE.

In the communication network 1, wireless devices e.g. a first wireless device 10 such as a mobile station, a non-access point (non-AP) STA, an STA, a user equipment, and/or a wireless terminal, communicate via one or more Access Networks (AN), e.g. RAN, to one or more core networks (CN). It should be understood by those skilled in the art that "wireless device" is a non-limiting term which means any terminal, wireless communication terminal, user equipment, Machine Type Communication (MTC) device, Device to Device (D2D) terminal, vehicle, or node e.g. smart phone, laptop, mobile phone, sensor, relay, mobile tablets, or even a base station communicating within a cell.

The communication network 1 comprises a radio network node 12 providing radio coverage over a geographical area, a first service area, of a first radio access technology (RAT), such as LTE, Wi-Fi or similar. The radio network node 12 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the first radio access technology and terminology used.

Furthermore, the communication network 1 comprises a first core network (CN) virtually network sliced into a number of network slices, each network slice or core network slice supports a type of wireless devices and/or a type of services i.e. each network slice supports a different set of functionalities, which may be overlapping or separated. Network slicing introduces the possibility that the network slices are used for different services and use cases and these services and use cases may introduce differences in the functionality supported in the different network slices. Each network slice may comprise one or more network nodes providing the services/functionalities for the respective network slice. Each slice may comprise a network node. For example, a first network slice for massive MTC devices may comprise a first network node 13. A second network slice for critical MTC devices may comprise a second network node 14. A third network slice for MBB devices may comprise a third network node 15. Each network slice supports a set of functionalities out of a total set of functionalities in the communication network. E.g. the first network node 13 supports a first set of functionalities out of the total set of functionalities in the communication network 1. The first set of functionalities is separated from a different set of functionalities out of the total set of functionalities in the communication network 1. E.g. the first set of functionalities being e.g. associated with Massive MTC devices is separated or logical separated, e.g. using separated data storage or processing resources, from a second set of functionalities of the second network slice e.g. supporting critical MTC devices. The first set of functionalities as well as other sets of functionalities may be associated with a certain type of wireless devices, a certain enterprise, a certain operator or a certain agreement. The network node illustrated herein is exemplified as the first network node 13 but does also cover the second and third network nodes.

The first set of functionalities may use one or more resources in a core network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network node may be separated from other network nodes supporting a second set of functionalities out of the total set of functionalities in the communication network. Separated meaning herein physical separated wherein the network nodes may be executed on different hardware platforms and therefore using different resources of the hardware, and logically separated wherein the network nodes may be executed on a same hardware platform and use different resources such as memory parts or resources of processor capacity but may also use some same resources of the hardware e.g. a single physical network node may be partitioned into multiple virtual network nodes.

Hence, the first network node 13 supports the first set of functionalities out of the total set of functionalities in the core network of the communication network, which first set of functionalities belongs to the first network slice of the core network, and is separated from another set of functionalities out of the total set of functionalities in the core network.

When it comes to enable communication with other networks serving the same kind of device application, one common Network-Network Interface (NNI) service layer agreement may be established with other network operators but each operator may implement different slice types or may even support no slicing at all.

When the first wireless device 10 served by a particular slice type, e.g. the first network slice, requests communication with a second wireless device 11 or server belonging to another part of the communication network 1, a second core network, via a receiving network node 17, embodiments herein enable the first network node 13 serving the requesting wireless device 10 to indicate over a NNI connection which 'network slice', e.g. first network slice, the request refers to. Network slices via NNI may be denoted as Network Network Slice (NNS). This might be of special importance if a same user identity, e.g. public number or IP number, is used to address the other wireless device 11 for different types of communication. Embodiments herein introduce a network slice identifier, network slice ID, via the NNI. The network slice ID is used both by the NNI and the receiving network node 17. It helps the receiving network node 17 to push further the request over to the right access network slice e.g. to a machine type communication device slice or to a mobile broadband type slice. Hence, according to embodiments herein, the first network node 13 initiates a request transmission, to the receiving network node 17, for communicating with the second wireless device 11, which request transmission comprises a first network slice identity, a first network slice ID, of the first network slice identifying the supported first set of functionalities. The receiving network node 17, which may be a Network-network interface node or a core network node of the second core network, receives the request transmission e.g. a Session Initiation Protocol (SIP) request with the first network slice ID and is thereby informed of the first set of functionalities and may map or forward the transmission request to a similar or same network slice in the second core network.

Figure 9:
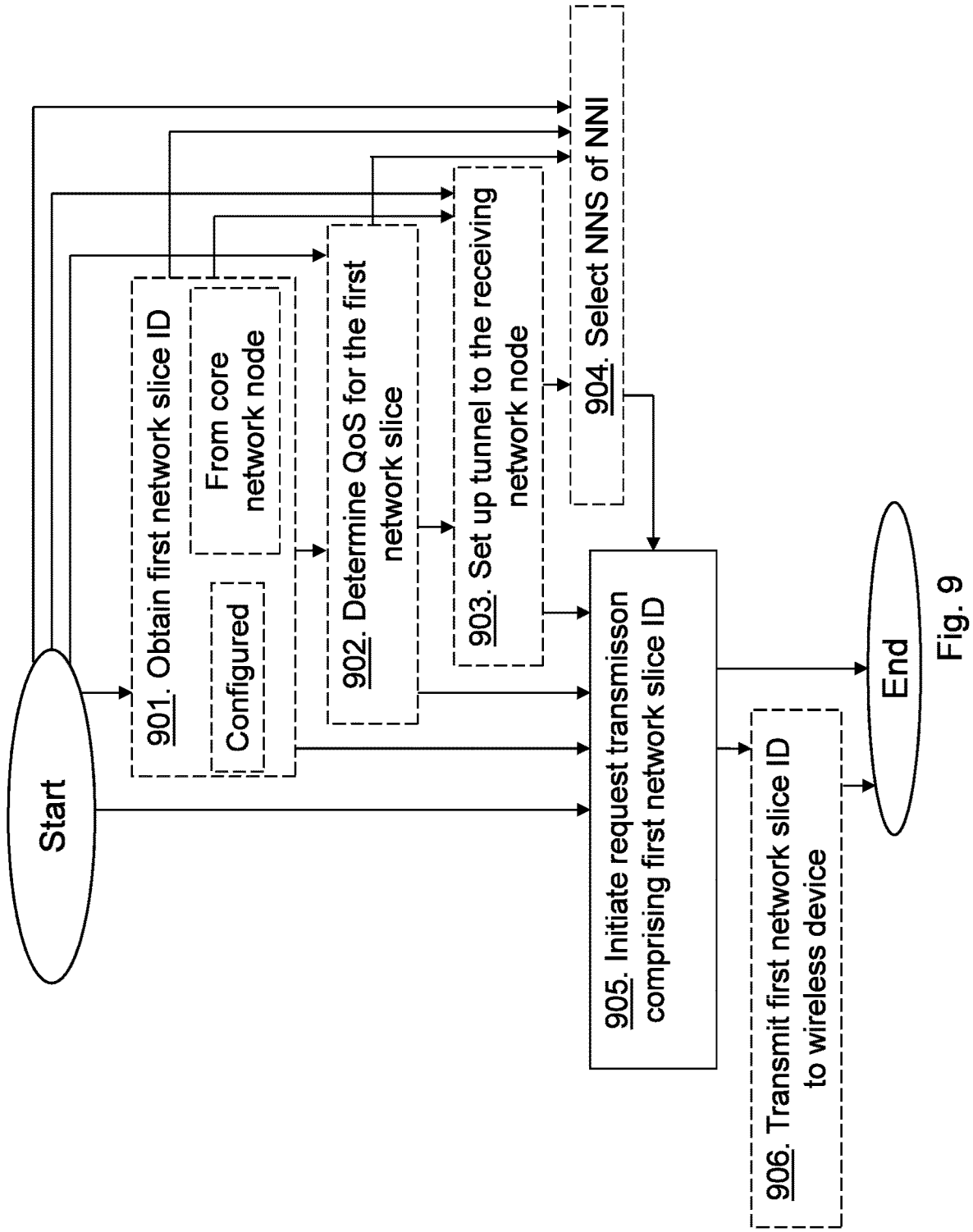
FIG. 9 is a schematic flowchart depicting a method performed by a network node according to embodiments herein.

The method actions performed by the first network node 13 for enabling communication between the first wireless device 10 of the first core network in the communication network 1 and the second wireless device 11 of the second core network in the communication network 1 according to some embodiments will now be described with reference to a flowchart depicted in FIG. 9. The actions do not have to be taken in the order stated below, but may be taken in any suitable order. Actions performed in some embodiments are marked with dashed boxes. The first network node 13 supports the first set of functionalities out of the total set of functionalities in the first core network of the communication network, which first set of functionalities belongs to the first network slice of the first core network, and is separated from another set of functionalities out of the total set of functionalities in the first core network. The first network node 13 may be a Mobility Managing Entity, a Serving GPRS Support Node (SGSN), or a corresponding node e.g. in a 5G network. GPRS meaning General Packet Radio Services.

Action 901. The first network node 13 may obtain the first network slice ID during configuration of the first network node 13 or by receiving the first network slice ID from a core network node. The first network node 13 may obtain the first network slice ID by retrieving the first network slice ID based on an Internet Protocol address of an incoming packet or a communication address of an incoming packet. The first network node 13, being e.g. a boarder element of the first core network, may determine the first network slice ID by relating it, e.g. to the IP address in incoming packets in case there is a one to one mapping between IP address and slice ID. Additionally or alternatively, the first network node 13 may determine the first network slice ID by relating it to the communication identifier, e.g. an IMS Communication Service Identifier (ICSI) in the IMS, embedded in the signaling, in case there is a one to one mapping between the communication identifier and first network slice ID.

Action 902. The first network node 13 may determine a quality of service for the first network slice, and the request transmission further comprises an indication indicating the determined quality of service. E.g. a slice boarder function can, if needed, determine the QoS to be provided for the first network slice based on information provided from packet core or from signaling or media provided from the wireless device 10. The slice boarder function may implement policies to select the QoS, e.g. as follows: —Select a default QoS; —Select the most stringent QoS requirements, e.g. if there is a mixture of communication via the slice select the most stringent QoS requirements; and—Perform a mapping to QoS being possible via NNS, e.g. there are less QOS classes supported via the NNI than what is needed for the communication services.

Action 903. The first network node 13 may set up a tunnel or slice tunnel to the receiving network node 17 using a tunneling protocol, which tunnel is confidentiality protected. Thus, the whole communication between networks over the NNI may be embedded in the tunnel, using the tunneling protocol, which may be confidentiality protected. Hence only the first network slice ID and destination address, and if needed the QoS for the whole tunnel, is visible over to the NNI. An element in the first core network is the start point of the tunnel; correspondingly there is a network element that is the end point of the tunnel. The tunnel can only be established if all networks on the path support the slice type and corresponding communication requirements. The tunnel completely hides the slice types used in both networks and the communication. It simplifies the setup of NN agreements and the operation.

Action 904. The first network node 13 may select a suitable NNS of the NNI based on the first network slice ID and then the first network slice ID is included in the signaling over the NNS in action 905.

Action 905. The first network node 13 initiates the request transmission, to the receiving network node 17, for communicating with the second wireless device. The request transmission comprises the first network slice identity, first network slice ID, of the first network slice identifying the supported first set of functionalities. The first network node 13 is triggered to initiate the request transmission when receiving a request from the first wireless device 10. The request transmission may be performed using said tunnel protocol in action 903 above. The request transmission may further comprise a destination address. The first network node 13 being e.g. the boarder element or a slice boarder function, may receive the first network slice ID using signaling with packet core network, and possibly map it to a destination slice ID to be used in communication with other operators of the second core network. Further information may be provided together with the first network slice ID in the transmission request:

Quality of Service (QoS) of the first network slice—dynamical and optional: for the case that the required QoS per network slice changes over time.

Destination network, as part of longer address or as own address. E.g. epc.mnc072.mcc302.3gppnetwork.org.

Action 906. The first network slice ID may be provided or transmitted from the first network node 13 via the radio network node 12 to the first wireless device 10 and the first wireless device 10 may include it in any further signaling towards the first core network.

An advantage of embodiments herein is that two peer operators, i.e. two core networks, can share a single NNI connection for multiple network slices between their core networks instead of multiple NNI connections, one as per dedicated sliced access network i.e. network slice. The NNI may be configured to only support the network slice types or even only the slice tunneling protocol but not each communication service that runs within the network slice. This limits the complexity while at the same time it allows to rapidly introduce new services without impacting the NNI. Hence by using the tunneling two networks may hide their exchange of signaling, e.g. network slice IDs, by means of setting up the tunnel between them. This makes it impossible for an intermediate IPX network to discover the content of that signaling.

Figure 10:
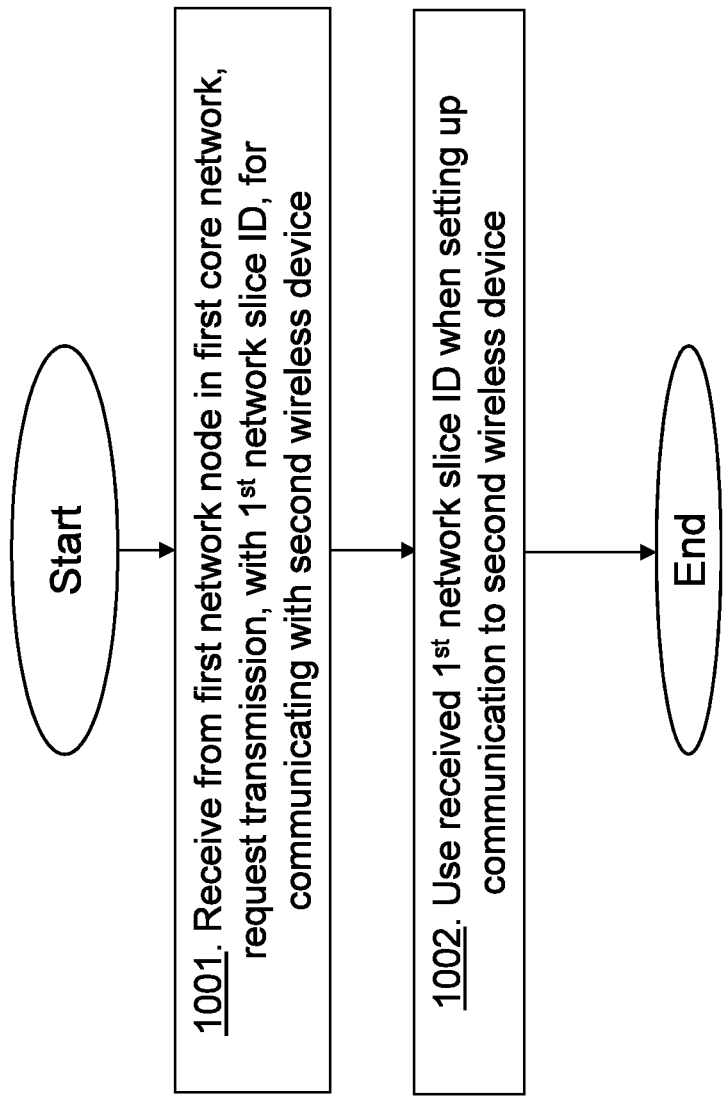
FIG. 10 is a schematic flowchart depicting a method performed by a radio network node according to embodiments herein.

The method actions performed by the receiving network node 17, e.g. a boarder node of the second core network or a NNI node of the NNI, for enabling communication between the first wireless device 10 of the first core network in the communication network 1 and the second wireless device 11 of the second core network in the communication network 1 according to some embodiments will now be described with reference to a flowchart depicted in FIG. 10.

Action 1001. The receiving network node 17 receives from the first network node 13 in the first core network, the request transmission for communicating with the second wireless device 11. The request transmission comprises the first network slice identity, first network slice ID, of the first network slice, which first network slice ID identifies the first set of functionalities supported by the first network node 13 out of the total set of functionalities in the first core network of the communication network. The first set of functionalities belongs to the first network slice of the first core network, and is separated from another set of functionalities out of the total set of functionalities in the first core network. The tunnel may be set up to the receiving network node 17 in that receiving a tunnel set up request from the first network node 13 using the tunneling protocol. The tunnel is confidentiality protected.

Action 1002. The receiving network node 17 uses the received first network slice ID when setting up communication to the second wireless device 11. The receiving network node 17 e.g. a target operator node, uses the obtained first network slice ID to route the incoming traffic to a right network slice within its own core network. Hence the first network slice ID can be used for traffic routing, instead of IP address or service identifier. Hence, by providing the first network slice ID in conjunction with routing of e.g. a Session Initiation Protocol (SIP) request the receiving network node 17 is informed and may map the incoming SIP request to a similar or same network slice in the second core network.

Further information may be provided together with the first network slice ID:

Quality of Service (QoS) of the first network slice—dynamical and optional: for the case that the required QoS per network slice changes over time.

Destination network, as part of longer address or as own address. E.g. epc.mnc072.mcc302.3gppnetwork.org.

Figure 11:
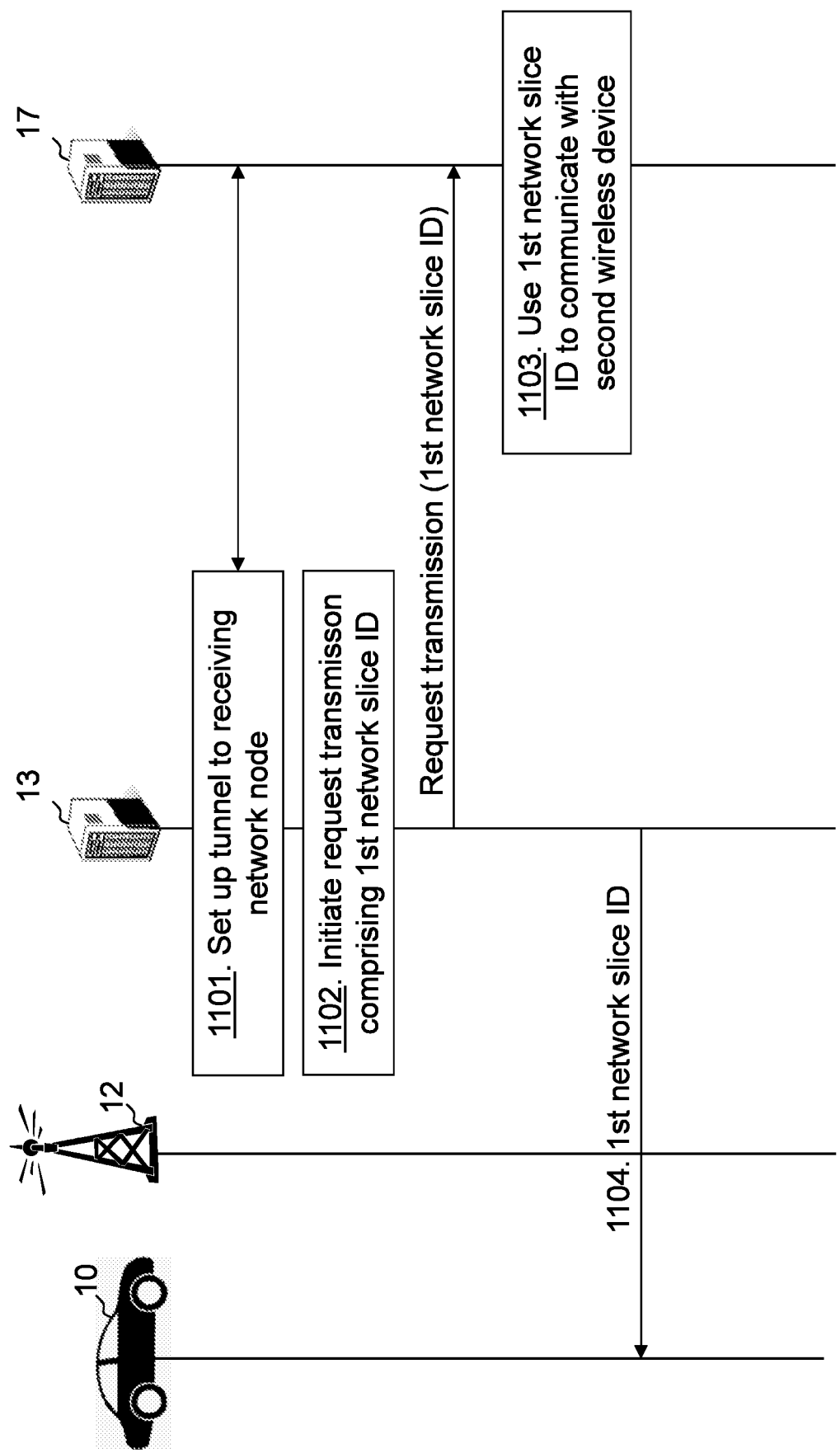
FIG. 11 is a combined flowchart and signalling scheme according to embodiments herein.

FIG. 11 is a combined flowchart and signalling scheme depicting some embodiments herein.

Action 1101. The first network node 13 sets up the tunnel to the receiving network node 17 using the tunneling protocol. Thus, the whole communication between networks over the NNI may be embedded in the tunnel, using the tunneling protocol. The first network node 13 or an element of the first network node in the first core network is the start point of the tunnel; correspondingly the receiving network node 17 is the end point of the tunnel. The tunnel completely hides the slice types used in both networks and the communication.

Action 1102. The first network node 13 initiates the request transmission comprising the first network slice-ID to the receiving network node 17. The request transmission requesting to set up a communication between the second wireless device 11 and the first wireless device 10.

Action 1103. The receiving network node 17 uses the received first network slice ID when setting up communication to the second wireless device 11. E.g. matching the first set of functionalities to set of functionalities of a network slice of the second core network and forwards the request to a matched network slice.

Action 1104. Furthermore, the first network node 13 may transmit and provide the first network slice ID to the first wireless device 10 and the first wireless device 10 may include it in any further signaling towards the first core network.

FIG. 12 shows an example where the same network slice ID may be used across the NNI and also at the receiving second core network. Thus, the receiving network node 17 being exemplified as a border node to the NNI receives the request transmission forwards the request transmission over a same network slice ID over the NNI and to a same network slice at the second core network. E.g. network slice IDs 'slice #1' and 'slice #2' are used in both core networks.

FIG. 13 shows an example where a similar but differently denoted network slice ID may be used across the NNI and also at the receiving second core network. Thus, a first receiving network node 17(1) being an example of the receiving network node 17 and being exemplified as a border node to the NNI receives the request transmission and maps the first network ID to a similar network slice of the NNI e.g. a third network slice ID, Slice #3. A second receiving network node 17(2) receives the request transmission over the NNI and maps the third network slice ID to a similar network slice at the second core network, e.g. a fourth network slice ID, Slice #4. Similar meaning supporting same or similar set of functionalities. Slice #1 may be a standardized slice and slice #2, #3 and #4 may be non-standardized slice types, and then there might be a need to map them to one another.

In order to perform the methods herein the first network node 13 is provided. FIG. 14 is a block diagram depicting the first network node 13 for enabling communication between the first wireless device 10 of the first core network in the communication network and the second wireless device 11 of the second core network in the communication network 1. The first network node 13 is configured to support the first set of functionalities out of the total set of functionalities in the first core network of the communication network, which first set of functionalities belongs to the first network slice of the first core network, and is separated from another set of functionalities out of the total set of functionalities in the first core network. The first network node 13 may comprise processing circuitry 1401 configured to perform the methods herein.

The first network node 13 is configured to initiate the request transmission, to the receiving network node 17, for communicating with the second wireless device 11, which request transmission comprises the first network slice identity of the first network slice identifying the supported first set of functionalities. The request transmission may further comprise the destination address.

The first network node 13 may be configured to trigger the initiation of the request transmission when receiving the request from the first wireless device 10.

The first network node 13 may further be configured to obtain the first network slice identity during configuration of the first network node 13 or by being configured to receive the first network slice identity from the core network node.

The first network node 13 may further be configured to retrieve the first network slice identity based on the IP address of the incoming packet or the communication address of the incoming packet.

The first network node 13 may further be configured to determine the quality of service for the first network slice, and the request transmission further comprises the indication indicating the determined quality of service.

The first network node 13 may further be configured to set up the tunnel to the receiving network node 17 using the tunnel protocol, which tunnel is confidentiality protected, and the request transmission is performed using said tunnel protocol.

The first network node 13 comprises an initiating module 1402. The processing circuitry 1401 and/or the initiating module 1402 may be configured to initiate the request transmission, to the receiving network node 17, for communicating with the second wireless device 11, which request transmission comprises the first network slice identity of the first network slice identifying the supported first set of functionalities. The processing circuitry 1401 and/or the initiating module 1402 may be configured to trigger the initiation of the request transmission when receiving the request from the first wireless device 10.

The first network node 13 may comprise an obtaining module 1403. The processing circuitry 1401 and/or the obtaining module 1403 may be configured to obtain the first network slice identity during configuration of the first network node 13 or by being configured to receive the first network slice identity from the core network node.

The first network node 13 may comprise a retrieving module 1404. The processing circuitry 1401 and/or the retrieving module 1404 may be configured to retrieve the first network slice identity based on an IP address of an incoming packet or a communication address of an incoming packet.

The first network node 13 may comprise a determining module 1405. The processing circuitry 1401 and/or the determining module 1405 may be configured to determine the quality of service for the first network slice, and the request transmission further comprises the indication indicating the determined quality of service.

The first network node 13 may comprise a tunneling module 1406. The processing circuitry 1401 and/or the tunneling module 1406 may be configured to set up the tunnel to the receiving network node 17 using the tunnel protocol, which tunnel is confidentiality protected, and the request transmission is performed using said tunnel protocol.

The first set of functionalities as well as other sets of functionalities may be associated with a certain type of wireless devices, a certain enterprise, a certain operator or a certain agreement. Thus, the first network node may be configured to support e.g. Massive MTC devices, Critical MTC devices, MBB devices, or Vertical Industry devices.

The first network node 13 further comprises a memory 1407. The memory comprises one or more units to be used to store data on, such as network slice IDs, QoSs, indications, IP addresses, communication addresses, applications to perform the methods disclosed herein when being executed, and similar.

The methods according to the embodiments described herein for the first network node 13 are respectively implemented by means of e.g. a computer program 1408 or a computer program product, comprising instructions, i.e., software code portions, which, when executed on at least one processor, cause the at least one processor to carry out the actions described herein, as performed by the first network node 13. The computer program 1408 may be stored on a computer-readable storage medium 1409, e.g. a disc or similar. The computer-readable storage medium 1409, having stored thereon the computer program, may comprise the instructions which, when executed on at least one processor, cause the at least one processor to carry out the actions described herein, as performed by the first network node 13. In some embodiments, the computer-readable storage medium may be a non-transitory computer-readable storage medium.

Figure 15:
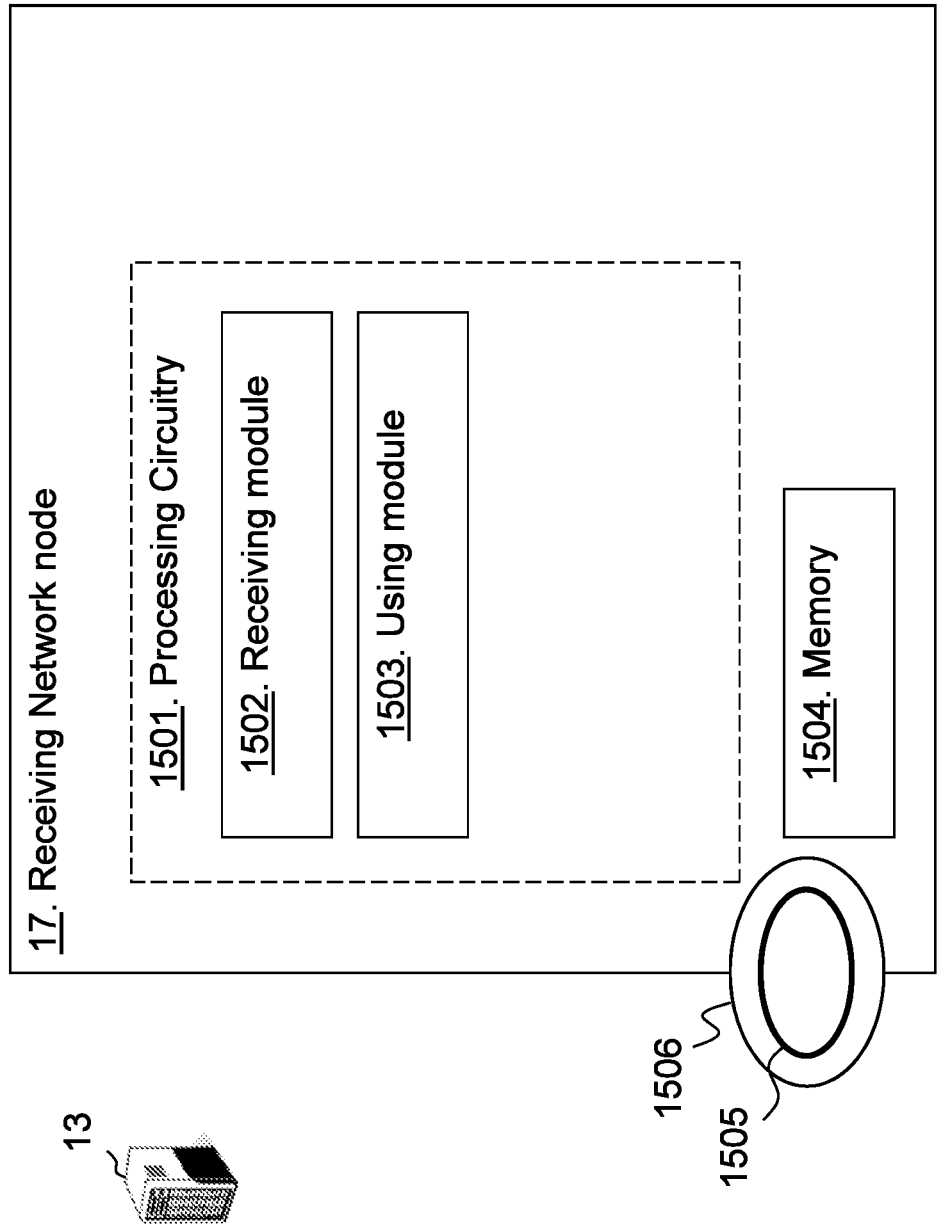
FIG. 15 is a block diagram depicting a radio network node according to embodiments herein.

In order to perform the methods herein the receiving network node 17 is provided. FIG. 15 is a block diagram depicting the receiving network node 17 for enabling communication between the first wireless device 10 of the first core network in the communication network 1 and the second wireless device 11 of the second core network in the communication network 1 according to embodiments herein. The receiving network node 17 may comprise processing circuitry 1501 configured to perform the methods herein.

The receiving network node 17 is configured to receive, from the first network node 13 in the first core network, the request transmission for communicating with the second wireless device 11. The request transmission comprises the first network slice identity of the first network slice, which first network slice identity identifies the first set of functionalities supported by the first network node 13 out of the total set of functionalities in the first core network of the communication network. The first set of functionalities belongs to the first network slice of the first core network, and is separated from another set of functionalities out of the total set of functionalities in the first core network.

The receiving network node 17 is configured to use the received first network slice identity when setting up communication to the second wireless device 11.

The receiving network node 17 may comprise a receiving module 1502. The processing circuitry 1501 and/or the receiving module 1502 may be configured to receive, from the first network node 13 in the first core network, the request transmission for communicating with the second wireless device 11. The request transmission comprises the first network slice identity of the first network slice, which first network slice identity identifies the first set of functionalities supported by the first network node 13 out of the total set of functionalities in the first core network of the communication network. The first set of functionalities belongs to the first network slice of the first core network, and is separated from another set of functionalities out of the total set of functionalities in the first core network.

The receiving network node 17 may comprise a using module 1503. The processing circuitry 1501 and/or the using module 1503 may be configured to use the received first network slice identity when setting up communication to the second wireless device 11.

The receiving network node 17 further comprises a memory 1504. The memory comprises one or more units to be used to store data on, such as network slice IDs, QoSs, indications, IP addresses, communication addresses, S1 mappings to network slice IDs, applications to perform the methods disclosed herein when being executed, and similar.

The methods according to the embodiments described herein for the receiving network node 17 are respectively implemented by means of e.g. a computer program 1505 or a computer program product, comprising instructions, i.e., software code portions, which, when executed on at least one processor, cause the at least one processor to carry out the actions described herein, as performed by the receiving network node 17. The computer program 1505 may be stored on a computer-readable storage medium 1506, e.g. a disc or similar. The computer-readable storage medium 1506, having stored thereon the computer program, may comprise the instructions which, when executed on at least one processor, cause the at least one processor to carry out the actions described herein, as performed by the receiving network node 17. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them.

Several of the functions may be implemented on a processor shared with other functional components of a radio network node or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first network node for enabling communication between a first wireless device of a first core network in a communication network and a second wireless device of a second core network in the communication network, wherein the first network node supports a first set of functionalities out of a total set of functionalities in the first core network, wherein the first set of functionalities is associated with a first network slice of the first core network and is distinct from another set of functionalities out of the total set of functionalities, the method comprising:
    initiating a request transmission, to a receiving network node of the second core network, for communicating with the second wireless device, wherein the request transmission comprises a first network slice identity, of the first network slice, that further identifies the supported first set of functionalities; and
    obtaining the first network slice identity during configuration of the first network node or by receiving the first network slice identity from a core network node, wherein the obtaining comprises retrieving the first network slice identity based on an Internet Protocol address of an incoming packet or a communication address of an incoming packet.

2. The method of claim 1, wherein the initiating is triggered by receiving a request from the first wireless device.

3. The method of claim 1, further comprising:
    determining a quality of service for the first network slice, wherein the request transmission further comprises an indication indicating the determined quality of service.

4. The method of claim 1, further comprising:
    setting up a tunnel to the receiving network node using a confidentiality-protected tunnel protocol; and
    performing the request transmission via the tunnel using the confidentiality-protected tunnel protocol.

5. The method of claim 1, wherein the request transmission further comprises a destination address.

6. A method performed by a receiving network node of a second core network for enabling communication between a first wireless device of a first core network in a communication network and a second wireless device of the second core network in the communication network, the method comprising:
    receiving, from a first network node in the first core network, a request transmission for communicating with the second wireless device, wherein:
    the request transmission comprises a first network slice identity of a first network slice and an indication indicating a quality of service of the first network slice,
    the first network slice identity further identifies a first set of functionalities supported by the first network node out of a total set of functionalities in the first core network, and
    the first set of functionalities is distinct from another set of functionalities out of the total set of functionalities; and
    using the received first network slice identity when setting up the communication with the second wireless device.

7. A first network node for enabling communication between a first wireless device of a first core network in a communication network and a second wireless device of a second core network in the communication network, wherein the first network node is configured to support a first set of functionalities out of a total set of functionalities in the first core network of the communication network, wherein the first set of functionalities is associated with a first network slice of the first core network and is distinct from another set of functionalities out of the total set of functionalities, the first network node comprising:

at least one processor; and a computer-readable storage medium comprising computer-executable instructions that, when executed by the at least one processor, configure the first network node to:

initiate a request transmission, to a receiving network node of the second core network, for communicating with the second wireless device, wherein the request transmission comprises a first network slice identity, of the first network slice, that further identifies the supported first set of functionalities;

obtain the first network slice identity during configuration of the first network node or by receiving the first network slice identity from a core network node; and retrieve the first network slice identity based on an Internet Protocol address of an incoming packet or a communication address of an incoming packet.

8. The first network node of claim 7, wherein execution of the instructions further configures the first network node to trigger the initiation of the request transmission when a request is received from the first wireless device.

9. The first network node of claim 7, wherein execution of the instructions further configures the first network node to determine a quality of service for the first network slice, and wherein the request transmission further comprises an indication indicating the determined quality of service.

10. The first network node of claim 7, wherein execution of the instructions further configures the first network node to:

set up a tunnel to the receiving network node using a confidentiality-protected tunnel protocol; and perform the request transmission via the tunnel using the confidentiality-protected tunnel protocol.

11. The first network node of claim 7, wherein the request transmission further comprises a destination address.

12. A receiving network node of a second core network operable to enable communication between a first wireless device of a first core network in a communication network and a second wireless device of the second core network in the communication network, the receiving network node comprising:

at least one processor; and a computer-readable storage medium comprising computer-executable instructions that, when executed by the at least one processor, configure the receiving network node to:

receive, from a first network node in the first core network, a request transmission for communicating with the second wireless device, wherein:

the request transmission comprises a first network slice identity of a first network slice and an indication indicating a quality of service of the first network slice, the first network slice identity further identifies a first set of functionalities supported by the first network node out of a total set of functionalities in the first core network, and the first set of functionalities is distinct from another set of functionalities out of the total set of functionalities; and use the received first network slice identity when setting up the communication with the second wireless device.

13. A non-transitory, computer-readable storage medium, having stored thereon a computer program comprising instructions that, when executed on at least one processor of a network node, configure the network node to perform operations corresponding to the method of claim 1.

* * * * *